(12) United States Patent
Stone et al.

(10) Patent No.: US 8,880,462 B2
(45) Date of Patent: Nov. 4, 2014

(54) METHOD, SYSTEM AND APPARATUS FOR PROVIDING INFORMATION TO CLIENT DEVICES WITHIN A NETWORK

(75) Inventors: Christopher J. Stone, Newtown, PA (US); David C. Goodwin, Holland, PA (US); Andrea C. Harriman, Yardely, PA (US)

(73) Assignee: Motorola Mobility LLC, Chicago, IL (US)

( * ) Notice: Subject to any disclaimer, the term of this patent is extended or adjusted under 35 U.S.C. 154(b) by 813 days.

(21) Appl. No.: 11/301,925

(22) Filed: Dec. 13, 2005

(65) Prior Publication Data

US 2007/0136304 A1    Jun. 14, 2007

(51) Int. Cl.
| | |
|---|---|
| G06F 17/30 | (2006.01) |
| H04W 76/00 | (2009.01) |
| H04N 21/488 | (2011.01) |
| H04N 21/81 | (2011.01) |
| H04L 29/08 | (2006.01) |
| H04N 21/442 | (2011.01) |

(52) U.S. Cl.
CPC ....... *H04N 21/44209* (2013.01); *H04W 76/007* (2013.01); *H04N 21/4882* (2013.01); *H04N 21/814* (2013.01); *H04L 67/12* (2013.01); *H04N 21/8146* (2013.01)
USPC .............................................. 707/609; 705/3

(58) Field of Classification Search
USPC .............................................. 705/3; 707/609
See application file for complete search history.

(56) References Cited

U.S. PATENT DOCUMENTS

| 7,010,303 B2* | 3/2006 | Lewis et al. .................... 455/445 |
| 2006/0036679 A1* | 2/2006 | Goodman et al. ............ 709/203 |
| 2006/0155581 A1* | 7/2006 | Eisenberger et al. ............. 705/3 |

\* cited by examiner

*Primary Examiner* — Kim Nguyen
(74) *Attorney, Agent, or Firm* — Fish & Richardson P.C.

(57) ABSTRACT

A method (40), system (10) and control device (14) are provided for delivering information, such as Emergency Alert System (EAS) information, to one or more client devices (16) in a network, e.g., a home network or business network. The control device (14), which is connected to the client devices (16) via a suitable home or business network connection, receives information, such as EAS information, from an appropriate transmission source (22). The control device (14) performs any one or more of a number of functions that allows the information to be properly received by appropriate client devices (16). Such functions include formatting or encoding the information as needed by the client devices (16) to properly receive the information. Also, using a tuner (38), the control device (14) can be tuned to an appropriate channel for providing the information to the appropriate client devices (16).

18 Claims, 2 Drawing Sheets

METHOD, SYSTEM AND APPARATUS FOR PROVIDING INFORMATION TO CLIENT DEVICES WITHIN A NETWORK

BACKGROUND OF THE INVENTION

1. Field of the Invention

The invention relates to networks, such as home or business networks. More particularly, the invention relates to delivering information, such as Emergency Alert System (EAS) messages, to client devices in home or business networks.

2. Description of the Related Art

Many end user locations, such as homes or businesses, include a number of client devices connected together via a network connection, i.e., a home or business network. Such client devices include computers, televisions, personal digital assistants (PDAs), audio receivers, video receivers, phones (including screen phones), and other suitable client devices. Often, the client devices are connected, via the home network connection, to a control device, such as a signal converter or decoder (set-top) box. The control device or set-top box (STB) typically receives information or signals from a transmission source, such as a cable television plant or headend, and decodes the information into readable content, e.g., content that can be displayed on a television screen.

Various information typically is delivered to set-top boxes via any of several transmission channels, including the forward application transport (FAT) channel, the forward data channel (FDC), and the Data Over Cable Service Interface Specification (DOCSIS) channel. The FAT channel delivers broadcast data and compressed video and audio formatted according to the MPEG (Moving Pictures Experts Group) 2 standard or similar standards. The FDC delivers Internet Protocol (IP) traffic. The DOCSIS channel typically delivers information formatted according to the DOCSIS standard to devices, such as cable modems and other similar devices.

One type of information transmitted to set-top boxes via these channels or other similar channels is information provided by the Emergency Alert System (EAS). The EAS is a federally managed alert system that uses a digital system architecture to allow transmission sources, such as broadcast stations, cable systems, satellite companies, and other services, to send and receive emergency information quickly and automatically. Typically, EAS messages are delivered in accordance with one or more transmission protocols, such as the transmission protocols established by the Society of Cable Telecommunications Engineers (SCTE), e.g., SCTE-18. EAS messages typically are formatted according to the MPEG-2 format or other suitable format.

Many client devices in a home or business network are not connected to the set-top box via the FAT channel, the FDC, the DOCSIS channel or other transmission channels that are used to deliver EAS information and other information. Rather, the client devices often are connected to the set-top box via other networking connection technology, such as network connections with transmission protocols in accordance with the standards established by the Multimedia over Coax Alliance (MoCA). Accordingly, such client devices usually are not configured to properly acquire and present EAS information and other information delivered by similar means. Moreover, many client devices are not equipped or configured with the appropriate hardware to properly process such information, even if such devices are connected directly to one or more transmission channels typically used to deliver EAS information and other information.

DETAILED DESCRIPTION

Figure 1:
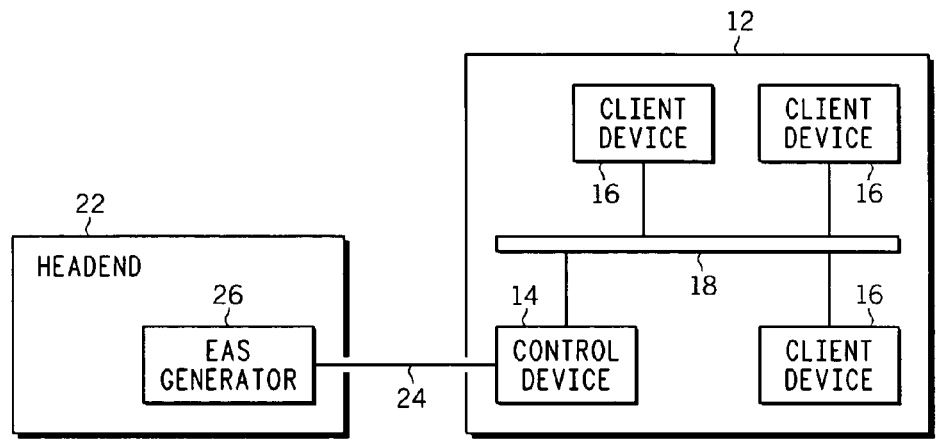
FIG. 1 is a block diagram of a system that provides information, such as EAS information, to client devices in a home or business network.

In the following description, like reference numerals indicate like components to enhance the understanding of the information delivering method, system and apparatus through the description of the drawings. Also, although specific features, configurations and arrangements are discussed hereinbelow, it should be understood that such specificity is for illustrative purposes only. A person skilled in the relevant art will recognize that other steps, configurations and arrangements are useful without departing from the spirit and scope of the invention.

Referring now to FIG. 1, shown is a block diagram of a home or business network system 10 that provides information, such as Emergency Alert System (EAS) information, to client devices in the network. The system 10 includes an end user location 12, which can be an end user home or business location. Within the end user location 12 is an end user network including a control device 14 and one or more client devices 16 connected together in a suitable network arrangement via a suitable network communication link (shown generally as link 18).

The control device 14 is, e.g., a set-top box (STB) or other suitable signal processing device, such as a residential gateway, a television, a video cassette recorder (VCR), or a digital video disk (DVD) recorder. The control device 14 is configured to receive information, such as EAS information, in any one or more suitable formats. The control device 14 also is configured to reformat or otherwise prepare the received information for transmission to one or more of the client devices 16 in a format suitable to be received by the particular client device 16. The control device 14 also can include one or more tuners for each of the client devices 16 connected thereto via the network communication link 18. All or a portion of the control device 14 can be comprised of any suitable structure or arrangement, e.g., one or more integrated circuits.

The client devices 16 include, e.g., computers, personal digital assistants (PDAs), audio receivers, video receivers, televisions, phones (including screen phones), and other suitable devices. The client devices 16 are configured to display or render information, including EAS messages, for an end-user display device, such as a display monitor or screen. All or a portion of the client device 16 can be comprised of any suitable structure or arrangement, e.g., one or more integrated circuits.

The control device 14 and the client devices 16 are connected to the network link 18 via any suitable home or business network connection. Such connections include, e.g., a token ring, Ethernet, Fast Ethernet, Gigabit Ethernet, any networking connection technology in accordance with the standards established by the Home Phoneline Networking Alliance (HomePNA) or the Multimedia over Coax Alliance (MoCA), powerline networking, and any networking connection technology in accordance with the IEEE 802.11 standard established by the Institute of Electrical and Electronics Engineers. Also, the home or business network connections can be part of a wired network using Ethernet cables, coaxial cables, fiber optic cables, or a part of a wireless network or any combination thereof. Moreover, the network connections can support any number of suitable transmission protocols, including Transmission Control Protocol/Internet Protocol (TCP/IP).

The control device 14 receives information, e.g., video streams, from a transmission source 22, which typically is a headend or core from a cable television plant or other service provider facility location. The control device 14 is connected to the transmission source 22 via any suitable connection 24, e.g., one or more coaxial cables and/or optical fibers, including a Hybrid Fiber Coaxial (HFC) cable system. Other suitable connections include suitable Fiber To The Premises (FTTP) systems, such as Fiber To The Curb (FTTC) or Fiber To The Home (FTTH), or over any suitable number of digital subscriber line systems (xDSL).

One or more of the control device 14 and the client devices 16 can be completely or partially configured in the form of hardware circuitry and/or other hardware components within a larger device or group of components. Alternatively, one or more of the control device 14 and the client devices 16 can be completely or partially configured in the form of software, e.g., as processing instructions or one or more sets of logic or computer code. In such configuration, the logic or processing instructions typically are stored in a data storage device (not shown), which typically is coupled to a processor or controller (not shown). Both the data storage device and the processor or controller can be included as part of the control device 14 and/or the client device 16, although such is not necessary. The processor or controller accesses the necessary instructions from the data storage device and executes the instructions or transfers the instructions to the appropriate location within one or more of the control device 14 and the client devices 16.

The transmission source 22 includes conventional components and hardware (not shown) suitable for normal operation of the transmission source 22. The transmission source 22 also includes an EAS generator 26, which generates and properly formats EAS messages and other information that the transmission source 22 is to transmit. The transmission source 22 also includes the hardware and/or software needed to provision the control device 14 properly to process information, such as EAS messages.

The transmission source 22 transmits or delivers information, such as EAS messages, over the connection 24 to the control device 14, via any of several information transmission channels. Such transmission channels include, e.g., the forward application transport (FAT) channel, the forward data channel (FDC), and the Data Over Cable Service Interface Specification (DOCSIS) channel. As discussed previously herein, the FAT channel delivers broadcast data and compressed video and audio that has been formatted according to the MPEG (Moving Pictures Experts Group) 2 or other suitable standard. The FDC delivers information that has been formatted according to the Internet Protocol (IP). The DOCSIS channel delivers information formatted according to the DOCSIS standard, which standard typically is used with cable modems and other similar devices.

Figure 2:
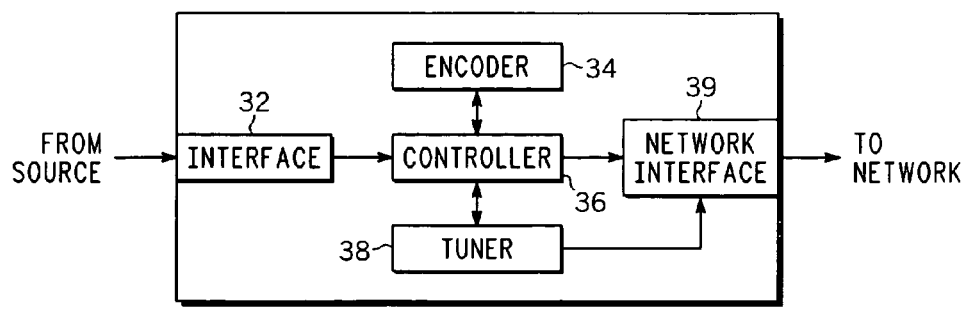
FIG. 2 is a block diagram of an apparatus, such as a control device, used in the system of FIG. 1.

Referring now to FIG. 2, with continuing reference to FIG. 1, shown is a block diagram of the control device 14 shown in the system 10 of FIG. 1. As discussed previously herein, the control device 14 can be a set-top box or other suitable signal processing control device. The control device 14 includes an interface or input interface 32 for receiving information from a transmission source, e.g., the transmission source 22, an encoder 34, and a controller 36. The control device 14 also includes a tuner 38 for one or more of the client devices 16 connected thereto via the network communication link 18. As discussed previously herein, the control device 14 receives information or signals from a transmission source, decodes the information into content that can be displayed on an end-user display, and transmits the information to an appropriate client device 16 for subsequent display on an end-user device associated with the given client device 16. Thus, the control device 14 also includes conventional components and hardware (not shown) suitable for such operations.

The encoder 34 encodes received information as needed by the control device 14 to prepare the information for subsequent delivery to other devices, e.g., the client devices 16 in the system 10. The tuner 38 tunes the control device 14 to a specific channel, e.g., for use in delivering a video stream to a television or, as will be discussed in greater detail hereinbelow, for tuning the control device 14 to a particular channel to allow a client device 16 to receive information, such as EAS information. The controller 36, which is operably connected to the encoder 34, the tuner 38 and most other components (not shown) in the control device 14, generally controls the operation of the control device 14 and most of its functions. As will be discussed in greater detail hereinbelow, the controller 36 is involved with many of the functions performed by the control device 14 in providing information, such as EAS information, to client devices 16 in the system 10.

The control device 14 also includes a network interface 39, for allowing the control device 14 to properly interface and communicate with the client devices 16 connected to the network 18. Within the control device 14, the network interface is operably coupled to the controller 36 and the tuner 38 as shown.

Figure 3:
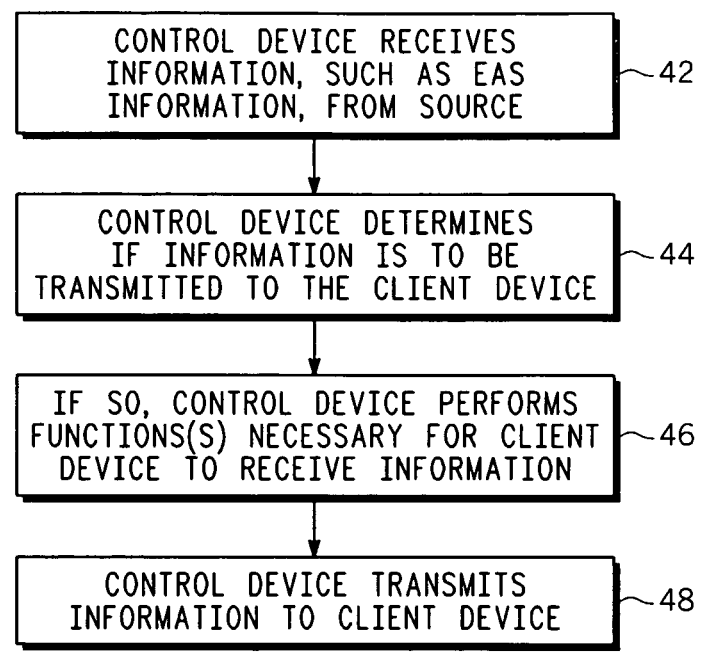
FIG. 3 is a flow chart of a method for providing information, such as EAS information, to client devices in a home or business network.

Referring now to FIG. 3, with continuing reference to FIG. 1 and FIG. 2, shown is a block diagram of a method 40 for providing information, such as EAS information, to client devices 16 in a home or business network. The method 40 includes the step 42 of the control device 14 receiving information from the transmission source 22. The information can include EAS information, e.g., EAS messages. As discussed previously, the transmission source 22 is a headend or other suitable information source that generates and transmits information to the control device 14, e.g., via the FAT channel, the FDC, the DOCSIS channel, or by other suitable data transmission channel.

The method 40 includes the step 44 of the control device 14 determining if information received by the control device 14 is to be received by any one or more of the client devices 16. The control device 14 has the ability, through conventional means, to determine various capabilities of the client devices 16 connected to the home or business network 18. For example, through conventional testing and information transmission protocols, such as the Home Media Architecture (HMA) set-top platform offered by Motorola Corp., the control device 14 determines, e.g., what type of client devices 16 are connected to the home or business network 18.

In this manner, for example, if the control device 14 receives an EAS message from the transmission source 22, the control device 14 will know, or is able to determine, which client devices 16 are the type of client devices that need to receive the EAS message to, in turn, present to its particular end user. If a particular client device 16 is not the type of device that, e.g., displays EAS messages or transmits EAS message audio, the control device 14 will know this information and will know that the EAS message does not have to be transmitted or delivered to such client device.

The control device 14 also is able to determine the specific audio/video assets and capabilities of each client device 16, and the particular hardware and/or software configurations of each client device 16 connected to the home or business network 18. Thus, the control device 14 knows or is able to determine which client devices 16 are suitable for (and capable of) receiving certain information, such as EAS information, and in what form or format.

The method 40 also includes the step 46 of performing at least one function to allow a client device 16 to receive information, such as EAS information, if the particular client device needs to receive such information and is capable of receiving such information. For example, the control device 14 can use the encoder 34 and/or the controller 36 to convert, format and/or encode information received from the transmission source 22. In this manner, the control device 14 can present information, including EAS information, in a form or format suitable to be read and processed by one or more types of client devices 16. Since the control device 14 knows what format or formats are suitable for each client device 16, the control device 14 can format the EAS information or other information accordingly for transmission to the particular client devices 16.

For example, if the EAS message received by the control device 14 requires text scroll, the control device 14 can format the text scroll in such a manner that one or more appropriate client devices 16 can receive and process the text scroll information so that the client device 16 can present the text scroll to the end user of the client device 16. Also, the control device 14 can provide applicable text scroll information to the appropriate client devices 16, e.g., in the form of text descriptions required to scroll the text of the EAS message. For example, the control device 14 can composite the text scroll information with the received information from the transmission source 22 for display on the end-user device of the appropriate client devices 16. The text descriptions can be in any suitable form, e.g., HyperText Markup Language (HTML), Javascript, or other suitable form.

In another example, the control device 14 can use the controller 36 to tune one or more of the tuners 38 to a particular channel, e.g., as defined by the EAS message. By tuning the various tuners 38 to the defined channel, the tuners 38 can allow the control device 14 to present the EAS information to the one or more client devices 16 associated with those tuners 38.

The ability of the control device 14 to determine whether particular client devices 16 are suitable to receive information, such as EAS information, can be at least partially derived from data contained in the information, e.g., as defined by the SCTE-18 standard. Also, the control device's knowledge of what task or tasks the particular client devices are performing contributes to such ability. For example, via conventional means like the use of application codes, the control device 14 is able to tell if a particular client device 16 is, e.g., displaying photos, using voice on demand (VOD), or is tuned to a particular audio/video service.

Once the control device 14 performs the functions necessary for one or more of the client devices 16 to receive information, such as EAS information, the method 40 performs the step 48 of the control device 14 transmitting or delivering the information to the appropriate client devices 16. As discussed previously, the control device 14 is able to determine which client devices 16 are to receive certain information.

As an example, with respect to the use of the tuners 38 to provide EAS information to client devices 16, assume the control device 14 receives an EAS message that is exclusively defined for a particular channel (e.g., channel 10). If a client device 16 already is tuned to channel 10, the control device 14 would not need to present the EAS message to the client device 16, since the client device 16 already would be receiving the EAS message on channel 10. However, if the particular client device 16 is tuned to another channel (e.g., channel 23), the control device 14 can tune the tuner 38 in the control device 14 associated with that particular client device 16 to channel 10 so that the control device 14 can present the audio/video of the EAS message to the particular client device 16. Thus, the client device 16 would be able or receive the EAS message in a suitable manner and, in turn, be able to provide the EAS message to its end user. Likewise, the control device 14 can tune the tuner 38 in the control device 14 associated with the particular client device 16 back to channel 23 once the EAS message has been completed.

The method and system described hereinabove allow the control device 14 to receive and process information, such as EAS information, manage and distribute such information to certain client devices 16 in a network 18 in a manner that allows the individual client devices 16 to, in turn, provide the information to their respective end users in a suitable form. In this manner, client devices 16 that do not have suitable hardware and/or software configurations to receive certain information, e.g., EAS information, can receive such information without having to change or upgrade their current configurations. For EAS information, the ability to deliver such information to such client devices 16 will result in the end users of the particular client devices 16 being made aware of, e.g., an EAS event.

The method shown in FIG. 3 may be implemented in a general, multi-purpose or single purpose processor. Such a processor will execute instructions, either at the assembly, compiled or machine-level, to perform that process. Those instructions can be written by one of ordinary skill in the art following the description of FIG. 3 and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), packetized or non-packetized wireline or wireless transmission signals.

It will be apparent to those skilled in the art that many changes and substitutions can be made to the information providing method, system and apparatus herein described without departing from the spirit and scope of the invention as defined by the appended claims and their full scope of equivalents.

The invention claimed is:

1. A computer program embodied in a computer-readable medium for delivering information to a network, the network including at least one control device and at least one client device coupled to the at least one control device, the program comprising instructions for execution by a computer, the program comprising:

instructions for receiving in the control device the information from an information source;

instructions for determining in the control device if the client device is capable of rendering the information received from the information source to an end user;

if the client device is capable of rendering the information the control device received from the information source to an end user, instructions for tuning to a first channel in the control device to allow the client device to receive the information the control device received from the information source when the client device is tuned to a second channel; and instructions for delivering by the control device to the client device the information received from the information source.

2. The computer program as recited in claim 1, further comprising instructions for converting by the control device the information received from the information source into a format that the client device is configured to receive.

3. The computer program as recited in claim 2, wherein the control device includes an encoder, and wherein the program further comprises instructions for encoding by the control device the information received from the information source in such a way that the client device is configured to receive the encoded information.

4. The computer program as recited in claim 1, wherein the instructions for determining if the information received from the information source is to be received by the client device further comprises instructions for determining if the information received from the information source is to be received by the client device based on a portion of the contents of the information the control device received from the information source.

5. The computer program as recited in claim 1, wherein the information includes at least one Emergency Alert System (EAS) message.

6. A network system, the network system receiving information from a transmission source, the network system comprising:

at least one control device configured to be coupled to the transmission source, the control device configured for receiving the information from the transmission source; and at least one client device coupled to the control device via a home or business network connection, wherein the control device is configured to determine if the client device is capable of rendering the information received from the information source to an end user, wherein, if the client device is capable of rendering the information the control device received from the transmission source to an end user, the control device reformats the information to allow the client device to receive and render the information the control device received from the transmission source, and wherein the control device is configured to deliver the reformatted information received from the transmission source to the client device.

7. The system as recited in claim 6, wherein the control device is coupled directly to the transmission source via at least one channel selected from the group consisting of a forward application transport (FAT) channel, a forward data channel (FDC), and a Data Over Cable Service Interface Specification (DOCSIS) channel, and wherein the control device receives the information from the transmission source via at least one of the at least one channels.

8. The system as recited in claim 6, wherein the home or business network connection further comprises a data transmission channel that transmits data between the control device and the client device according to a Multimedia over Coax Alliance (MoCA) transmission protocol.

9. The system as recited in claim 6, wherein the at least one control device further comprises a device selected from the group consisting of a set-top box and a residential gateway.

10. The system as recited in claim 6, wherein the at least one client device further comprises a device selected from the group consisting of a computer, a set-top box, a television, and a telephone.

11. The system as recited in claim 6, wherein the information includes at least one Emergency Alert System (EAS) message.

12. A device for delivering Emergency Alert System (EAS) information to at least one of a plurality of client devices in a home or business network, the device receiving the EAS information from a source, the device comprising:

an interface for receiving the EAS information from the source;

a controller coupled to the interface for determining if the at least one client device is capable of rendering the EAS information received from the source to an end user, for tuning to a first channel carrying the EAS information to allow the at least one client device to receive the EAS information the control device received from the source if the at least one client device is capable of rendering the EAS information the control device received from the source to an end user, and for delivering the EAS information received from the source to the at least one client device when the at least one client device is tuned to a second channel.

13. The device as recited in claim 12, further comprising an encoder coupled to the controller, wherein the encoder encodes the EAS information received from the source in such a way that the client device is configured to receive the encoded EAS information.

14. The device as recited in claim 13, wherein at least one of the controller, the encoder and the tuners is implemented in software executed by a computer.

15. The device as recited in claim 13, wherein at least one of the controller, the encoder and the tuners is implemented in hardware.

16. The device as recited in claim 12, wherein the controller converts the EAS information received from the source into a format that the client device is configured to receive.

17. The device as recited in claim 12, wherein at least a portion of the device is contained in a set-top box.

18. The device as recited in claim 12, wherein at least a portion of the device further comprises an integrated circuit.

* * * * *

UNITED STATES PATENT AND TRADEMARK OFFICE
CERTIFICATE OF CORRECTION

PATENT NO.         : 8,880,462 B2
APPLICATION NO.    : 11/301925
DATED              : November 4, 2014
INVENTOR(S)        : Stone et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 874 days.

Signed and Sealed this
Sixth Day of June, 2017

Michelle K. Lee
*Director of the United States Patent and Trademark Office*